Figure 1:
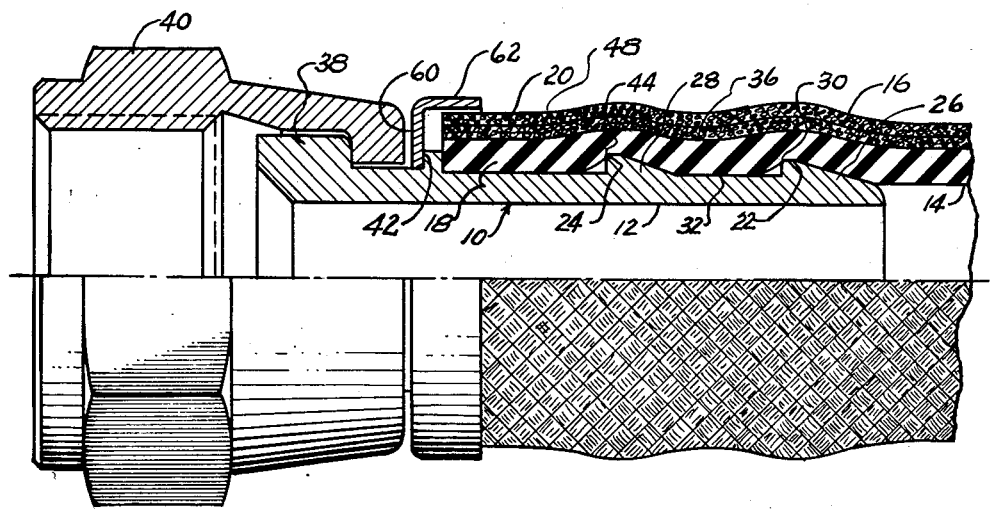

INVENTORS
WILLIAM M. CLINE
&
GEORGE E. SWICK, Jr.

BY
ATTORNEY

Sept. 3, 1957  W. M. CLINE ET AL  2,805,088
COMBINATION BRAIDED HOSE AND END FITTING NIPPLE
Filed May 26, 1953  3 Sheets-Sheet 2

INVENTORS
WILLIAM M. CLINE
&
GEORGE E. SWICK, JR.
BY
ATTORNEY

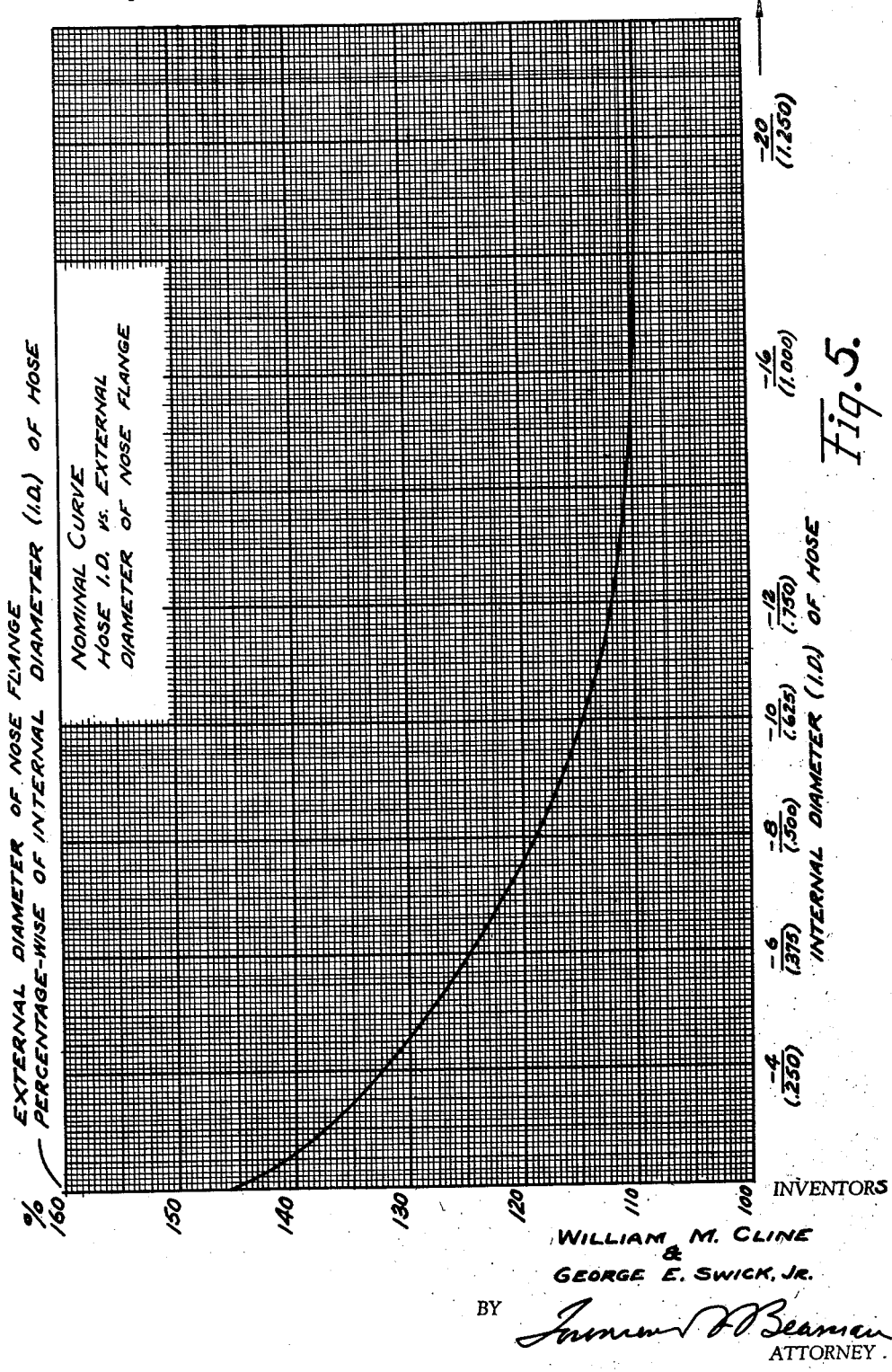

United States Patent Office 2,805,088
Patented Sept. 3, 1957

2,805,088

COMBINATION BRAIDED HOSE AND END FITTING NIPPLE

William M. Cline, Rives Junction, and George E. Swick, Jr., Horton, Mich., assignors to Aeroquip Corporation, Jackson, Mich., a corporation of Michigan Application May 26, 1953, Serial No. 357,478

4 Claims. (Cl. 285—239)

This invention relates to improvements in end fittings for flexible braided hose and, in particular, to improvements in the nipples employed in connection with such end fittings. By "flexible braided hose" it is intended to cover hose as employed to conduct pressure fluid (either positive or negative pressure) and which comprises an inner tube of rubber or rubber-like material encased in an outer layer, or layers, of braid wound to the conventional neutral braid angle. In particular, the present invention is concerned with hose and end fittings therefor which are capable of withstanding internal fluid pressure in the nighborhood of 700 p. s. i. and which have a safety factor of substantially three or four times that amount, at which the hose and end fitting will withstand separation and prevent leakage of the fluid, coupled with the ability of the hose end fitting to maintain a hold on the hose when the hose and the end fitting are subjected to an externally and axially applied pulling-apart force in the neighborhood of from 100 to 2000 lbs. depending upon the nipple size and hose diameter involved.

The conventional hose end fittings comprise an inner nipple and an outer socket which, when connected together, form an annular space between them in which an end portion of the hose is held secured, sometimes by the hose end being compressively held in said space, with the nipple being screwed through one end of the socket (so that the fitting is re-usable) and sometimes by one end of the socket being swaged onto an end portion of the hose contained between the nipple and the socket (so that the end fitting is not re-usable). In some fields of use, instead of employing an outer socket it has been the practice to employ external clamps for clamping the hose onto a nipple inserted into the hose bore from one end of the hose. In all instances, however, the usual practice is to employ an inner nipple in conjunction with an outer socket, or its equivalent, i. e. an external clamp, in the belief that such are essential if the end fitting is to remain secure upon the hose when the hose is connected for the flow of high pressure fluid, or when the hose is subjected to an externally applied pull, tending to pull the hose off the end fitting. This ability to resist pulling-off is known as "tensile strength," the exceeding of which will result in the hose itself being ruptured while leaving an end portion of the hose upon the nipple.

Requirements for end fittings for flexible hose required to conduct pressure fluid are that the end fitting should be so securely held upon the hose that not only is the end fitting sealed against leakage of the fluid but it will not "blow-off" from the hose due to the fluid pressure. It is further necessary that the connection between the end fitting and the hose should possess sufficient tensile strength to prevent the hose from being pulled off the nipple due to an externally applied pulling force.

It is an important object of the present invention to provide an improved nipple construction which, when inserted in the bore of a section of braided hose, causes the hose to exert such a grip upon the nipple that the nipple will be held onto the hose, with the hose sealed with respect thereto, so as to withstand the internal fluid pressure and an externally applied pulling force without the nipple and hose end separating, and this in the absence of any external socket, clamp or like means holding the hose end onto the nipple.

In particular, it is an important object of the invention to provide a nipple and hose assembly which provides the possibility, when the nipple is inserted into the bore of the braided hose, of the hose contracting itself upon the nipple at axially spaced locations, whereby the braided hose will be held onto the nipple against the influence of the conducted fluid pressure, with the hose bore being sealed with respect to one said location and the grip of the hose onto the nipple resisting pulling of the hose off the nipple by such a pulling force as is normally encountered in practice.

The above and further objects and advantages of the invention will appear clear from consideration of the following description with reference to the accompanying drawings and from the appended claims.

Figure 2:
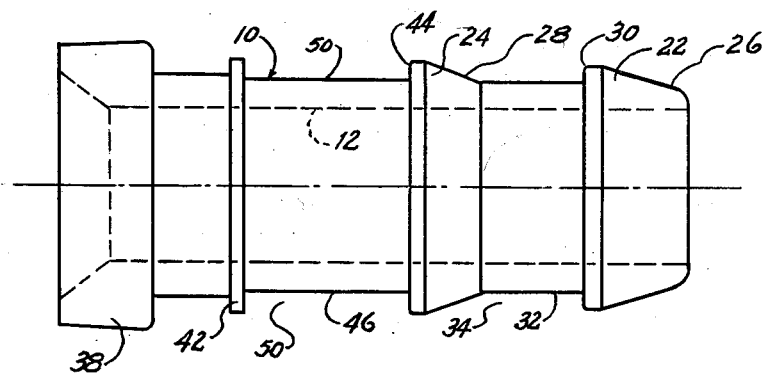
Figure 3:
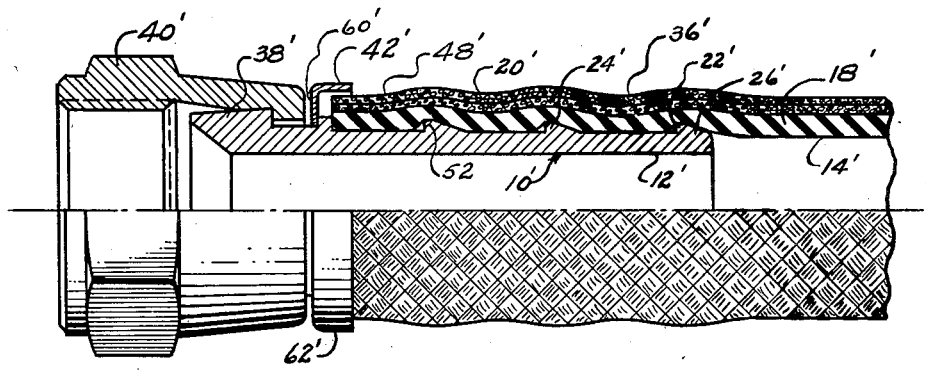
Figure 4:
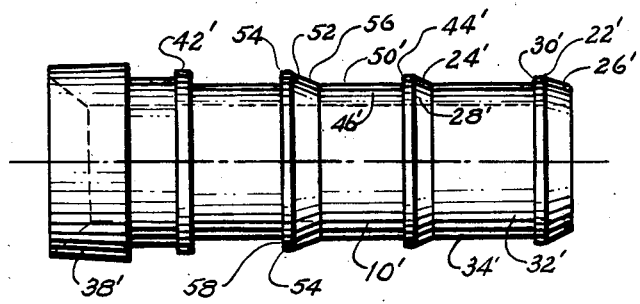

In the drawings:

Figure 1 is an enlarged part sectional and part elevational view of a nipple constructed in accordance with the invention shown fitted into the bore of a length of braided hose and applicable to hose having an internal diameter covering a range of ⅛ inch to approximately ⅝ inch, Figure 2 is an elevational view of the nipple itself, as seen in Figure 1, Figures 3 and 4 are similar views, respectively, to Figures 1 and 2 but of the nipple as employed for braided hose having an internal diameter beyond approximately ⅝ inch, and Figure 5 is a graph illustrating the external diameter of the leading nipple flange percentage-wise in relation to the internal diameter of the hose.

Referring to the drawings, and first to Figures 1 and 2, these show a nipple in accordance with the present invention which is suitable for use with flexible braided hose having an internal diameter of from .125 to .625 inch, which includes the conventional range of internal hose diameters of from ⅛ inch to ⅝ inch.

This nipple comprises an elongated tubular part 10, the bore of which is indicated at 12, and is in fluid flow communication with the bore 14 of the flexible braided hose 16 when the nipple is inserted in the hose bore, as seen in Figure 1.

The flexible hose is shown as comprising an inner tube 18 of rubber, or rubber-like material, encased in an outer cotton braid cover 20. In the particular example illustrated the hose has two layers of cotton braid wound to the conventional neutral braid angle. Satisfactory results have been obtained, however, with braiding of different numbers and material, including a wire braid, and braided hose having inner and outer rubber tubes, with the braid applied to the outside of the inner rubber tube.

The nipple is formed in this instance with two axially spaced flanges 22 and 24, seen more clearly in Figure 2. The flange 22 provides a bevelled nose 26 by which the nipple enters the hose bore, while the flange 24 is also formed with a bevelled leading surface 28 and is axially spaced from the trailing edge 30 of the flange 22 by the exterior tubular surface portion 32 of the nipple 10. The extent of this surface portion 32 is somewhat arbitrary but should be chosen so that the hose 16 will contract itself into the space 34 defined between the flanges 22 and 24, such contraction being indicated at 36 in Figure 1.

The nipple has a further flange 38 over which a coupling nut 40 is capable of being mounted, this flange 38 being at the outer end of the nipple, which, spaced between the flange 24 and the flange 38, has a further flange 42. The flange 42 is shown as an ordinary flange. Its shape and dimension is not critical, as in the case of the flanges 22 and 24, except that the outer diameter of the flange 42 should not be greater than the outer diameter of the flange 24, which flange 24 has a trailing edge 44. The flanges 24 and 42 are spaced apart by the exterior tubular surface portion 46 of the nipple, the extent of which portion is again somewhat arbitrary but should be sufficient to enable the hose to neck down, as indicated at 48 in Figure 1, into the space 50 (Figure 2) defined between these two flanges 24 and 42.

It has been proven in practice that, for the aforesaid internal hose diameters of from .125 inch to .625 inch, the nipple must have at least the two flanges 22 and 24. It has also been proven that the axial distance between the flanges 22 and 24, which in the flange form of Fig. 2 would be the axial length of the cylindrical surface portion 32, should not be less than approximately 10% of the internal diameter of the bore 14 of the hose 16 in order to provide clearance for the minimum amount of contraction of the hose which is capable of carrying out the objects of the invention. In order to provide for the proper tensile characteristic, i. e. the ability of the nipple to hold the hose from being pulled off the nipple by an external axially applied force, the axial distance between flanges 22 and 24 should be increased to the greatest length possible, consistent with the maintaining of the overall length of the nipple within practical proportions, and should approach the distance between the flanges 24 and 42. It has been proven in practice that satisfactory results are possible if the distance between the flanges 24 and 42 is greater than the distance between the flanges 22 and 24, but this is not to be regarded as critical.

In order that the objects of the present invention may be realized it is necessary that the external diameters of the flanges 22 and 24 should bear a definite relationship with respect to one another and to the internal diameter of the hose. It is also necessary that the trailing edges 30 and 44 of these flanges should be rounded off to a radius in the order of .005 to .010 inch.

Exhaustive research and tests have established that these diameters are related percentage-wise to the internal diameter of the braided hose and fall upon a nominal curve as disclosed in Figure 5, to be mentioned later, after the description of the nipple employed for braided hose having an internal diameter in excess of .625 inch.

For larger diameter flexible braided hose, i. e. where the internal diameter of the hose is greater than .625 inch it is necessary to resort to the use of an additional flange 52 as seen in Figures 3 and 4, which are illustrative of a nipple provided in accordance with this invention for use on said braided hose with a larger internal diameter. In these figures parts of the nipple which correspond to the nipple according to Figures 1 and 2 have been given the same reference numbers, primed.

The additional flange 52, like the flanges 22' and 24', also has a leading bevelled surface 56 and a trailing radial surface 58, with the peripheral edge 54 being rounded off to a radius in the order of .005 to .010 inch.

In respect to these two nipple constructions, and to other size nipples in accordance with the invention, the cylindrical portions shown on the flanges adjacent the rounded-off edges 30, 44 and 54 are provided in order to protect these edges against damage prior to assembly. The rounded-off edges prevent the edges from digging into the rubber of the hose bore. The order of the radius involved is critical. If the radius is much larger the grip on the inner hose tube is adversely affected and will give rise to blow-off. If sharp, the inner tube will be cut.

Referring to the graph of Figure 5, the base line denotes the internal hose diameter and the vertical line denotes the external diameter of the nose flange 22, 22' computed percentage-wise with respect to the internal hose diameter. Reference to this graph, for a given internal hose diameter (I. D.), gives the permissible external diameter of the hose flange 22, 22' at approximately the center of permissible departures upwards or downwards from the precise diameter size given on the graph. In this respect it is pointed out that the graph takes into account normal manufacturing tolerances but that other variations, such as variations in the construction of the hose may enable the invention to be carried out with the external diameter of the hose flange 22, 22' being somewhat greater or less than the actual diameter indicated on the graph.

Considering the graph it will be noticed that for braided hose having an internal diameter of the range ⅛ inch to approximately one inch, the external diameter of the flange 22, 22' should be in the order of 145 to 110%, respectively, of such diameter range, while for braided hose having an internal diameter beyond said diameter range the external diameter of the flange 22, 22' becomes substantially constant and is in the order of 110% of the internal diameter of the hose.

In Figures 1 to 4, 60 indicates a sheet metal flanged ring cap which is slidable upon the outside of the nipple and is engaged behind the nipple flange 42, 42' with its cylindrical flange 62 encompassing the end of the hose. This cap is provided for the purpose of covering the severed end of the hose and has no clamping action upon the hose. Its use is optional but is preferred in order to provide a neater appearance and to provide protection against fraying of the hose end.

Examples of nipple fittings constructed in accordance with the invention and applied to braided hose, together with test results, flange diameters and hose construction will now be given. In these tests, the ability of the fitting to hold onto the hose end and prevent leakage was related to the bursting of the hose and the tensile strength.

| Hose Construction | Nipple Construction | Hose Burst At— | Tensile Strength |
|---|---|---|---|
| | | p. s. i. | Pounds |
| 1. Rubber inner tube with 1/8 inch internal diameter encased in one cotton braid layer with cotton braid covered by outer rubber tube. | Nipple constructed according to Figs. 1 and 2. External diameter of flange 22=.175 inch. External diameter of flange 24=.184 inch. | 3,100 to 3,200 | 100 to 120. |
| 2. Rubber inner tube with 3/16 inch internal diameter encased in one cotton braid layer, with cotton braid covered by outer rubber tube. | Nipple constructed according to Figs. 1 and 2. External diameter of flange 22=.257 inch. External diameter of flange 24=.266 inch. | 2,700 | 100 to 120. |
| 3. Rubber inner tube with 1/4 inch internal diameter encased in one cotton braid layer, with cotton braid covered by outer rubber tube. | Nipple constructed according to Figs. 1 and 2. External diameter of flange 22=.330 inch. External diameter of flange 24=.340 inch. | 2,000 | 130. |
| 4. Rubber inner tube with 3/8 inch internal diameter encased in one cotton braid layer, with cotton braid covered by outer rubber tube. | Nipple constructed according to Figs. 1 and 2. External diameter of flange 22=.476 inch. External diameter of flange 24=.487 inch. | 1,400 to 1,600 | 180 to 200. |
| 5. Rubber inner tube with 1/2 inch internal diameter encased in one cotton braid layer, with cotton braid covered by outer rubber tube. | Nipple constructed according to Figs. 1 and 2. External diameter of flange 22=.610 inch. External diameter of flange 24=.620 inch. | 1,000 | 240 to 290. |
| 6. Rubber inner tube with 5/8 inch internal diameter encased in one cotton braid layer, with cotton braid covered by outer rubber tube. | Nipple constructed according to Figs. 1 and 2. External diameter of flange 22=.737 inch. External diameter of flange 24=.747 inch. | 750 to 800 | 260 to 270. |
| 7. Inner rubber tube encased in outer cover of two cotton braids. Internal diameter (ID) of rubber tube 1/4 inch. | Nipple constructed according to Figs. 1 and 2. External diameter of flange 22=.345 inch. External diameter of flange 24=.355 inch. | 2,200 to 2,600 | 220 to 270. |
| 8. Inner rubber tube encased in outer cover of two cotton braids. Internal diameter (ID) of rubber tube 3/8 inch. | Nipple constructed according to Figs. 1 and 2. External diameter of flange 22=.469 inch. External diameter of flange 24=.480 inch. | 2,400 to 2,600 | 340 to 350. |
| 9. Inner rubber tube encased in outer cover of two cotton braids. Internal diameter (ID) of rubber tube 1/2 inch. | Nipple constructed according to Figs. 1 and 2. External diameter of flange 22=.609 inch. External diameter of flange 24=.620 inch. | 2,500 to 2,600 | 730 to 750. |
| 10. Inner rubber tube encased in outer cover of two cotton braids. Internal diameter (ID) of rubber tube 5/8 inch. | Nipple constructed according to Figs. 3 and 4. External diameter of flange 22=.693 inch. External diameter of flange 24=.700 inch. External diameter of flange 52=.711 inch. | 2,200 to 2,300 | 800 to 850. |
| 11. Inner rubber tube encased in two cotton braids and having outer rubber tube encasing braids. Internal diameter (ID) of inner tube 1/2 inch. | Nipple constructed according to Figs. 1 and 2. External diameter of flange 22=.586 inch. External diameter of flange 24=.596 inch. | 2,200 | 720 to 740. |
| 12. Inner rubber tube encased in two cotton braids and having outer rubber tube encasing braids. Internal diameter (ID) of inner tube 3/4 inch. | Nipple constructed according to Figs. 3 and 4. External diameter of flange 22=.833 inch. External diameter of flange 24=.843 inch. External diameter of flange 52=.853 inch. | 1,900 to 2,100 | 1,250 to 1,600. |
| 13. Inner rubber tube encased in two cotton braids and having outer rubber tube encasing braids. Internal diameter (ID) of inner tube 1 inch. | Nipple constructed according to Figs. 3 and 4. External diameter of flange 22=1.115 in. External diameter of flange 24=1.125 in. External diameter of flange 52=1.135 in. | 1,400 to 1,500 | 1,750. |
| 14. Rubber inner tube encased in three cotton braids and braids covered by outer rubber sleeve. Internal diameter (ID) of inner tube 3/4 inch. | Nipple constructed according to Figs. 3 and 4. External diameter of flange 22=.833 inch. External diameter of flange 24=.843 inch. External diameter of flange 52=.853 inch. | 2,600 | 1,750 to 1,800. |
| 15. Inner rubber tube encased in three cotton braids and having outer rubber tube encasing braids. Internal diameter (ID) of inner tube 1.25 in. | Nipple constructed according to Figs. 3 and 4. External diameter of flange 22=1.370 in. External diameter of flange 24=1.380 in. External diameter of flange 52=1.390 in. | 1,500 | 2,500. |

Having this disclosed our invention, what we claim as novel and wish to secure by Letters Patent is as follows:

1. In combination with a flexible hose having an inner liner of rubber or rubber-like material defining the hose bore and an outer layer of criss-cross helical wound material wound to a substantially neutral braid angle and reinforcing said inner liner as a component part of the hose structure and coextensive with said inner liner, of a nipple end fitting inserted into said hose bore and retained in position under conditions of fluid pressure exceeding the burst capacity of the hose without material external clamping or embracing of that portion of the hose received upon the nipple, the retention between the hose and fitting being provided by the forces developed upon the initial assembly of the hose upon the nipple as well as the forces developed upon the hose by internal fluid pressure tending to return the reinforcing braided material to its neutral braid angle following expansion of the hose by the insertion of said fitting, said fitting having a tubular body part extending into the bore of said hose a distance exceeding the diameter of said hose in the locality of said reinforcing material, that portion of said fitting extending into said hose having axially spaced outwardly projecting flanges, said flanges including a leading nose flange at the hose entering end of said tubular body part, said nose flange being defined by a leading generally sloping portion to facilitate expansion of the hose and having a trailing radial shoulder merging with said generally sloping portion with a substantially sharp but rounded edge to obviate cutting of said inner liner, the expansion of said hose by said nose flange deviating the braided angle of said reinforcing material from neutral and sealing the hose bore, the external diameter of said nose flange at said rounded edge being in the order of 145% to 110% of the internal diameter of said hose liner before expansion by said fitting for hose having internal liner diameters in the range of ⅛" to 1", respectively, and being in the order of 110% of the internal liner diameter for hose having internal liner diameters beyond said range, the diameter of said body part between said flanges conforming substantially to the unexpanded internal diameter of said liner, the height of said radial shoulder being at least 25% of the thickness of said liner and the consistency of said liner being such that the degree of expansion of said reinforcing material approximates the degree of expansion of said inner liner, said tubular body part having at least one further outwardly projecting flange trailing behind and axially spaced from said nose flange, said trailing flange having approximately the same shape and dimensions as said nose flange, the generally sloping portion of said flanges extending from points on said part of the diameter approximating that of the unexpanded internal diameter of said liner with the length of the sloping portion of said flanges being in excess of twice the height of said radial shoulders, the base of the shoulder of each flange terminating at a cylindrical trailing portion having an axial length equal at least to twice the height of said radial shoulders, which provides contraction clearance for the portion of the hose between the flanges.

2. In the combination set forth in claim 1 wherein said trailing flange has an external diameter in the order of .010 of an inch greater than the external diameter of said nose flange.

3. In the combination set forth in claim 1, said rounded edge having a radius in the order of .005 to .010 of an inch.

4. In the combination set forth in claim 1, said body part having more than one trailing flange, the external diameter of said trailing flanges progressively increasing from said nose flange in steps of the order of .010".

References Cited in the file of this patent

UNITED STATES PATENTS

| | | |
|---|---|---|
| 1,234,908 | Keppel | July 31, 1917 |
| 1,263,557 | Hilton | Apr. 23, 1918 |
| 1,294,921 | Lewis | Feb. 18, 1919 |
| 1,786,489 | Hopkins | Dec. 30, 1930 |
| 1,994,784 | Porzel | May 12, 1934 |
| 1,996,855 | Cheswright | Apr. 9, 1935 |
| 2,077,869 | Bennett | Apr. 20, 1937 |
| 2,220,480 | Forsberg | Nov. 5, 1940 |

FOREIGN PATENTS

| | | |
|---|---|---|
| 2,451 | Great Britain | 1915 |